United States Patent [19]

Klie et al.

[11] Patent Number: 4,486,772
[45] Date of Patent: Dec. 4, 1984

[54] METHOD AND CIRCUIT ARRANGEMENT FOR PARTIAL CORRECTION OF THE DELINEATION IN COLOR IMAGE REPRODUCTION

[75] Inventors: Jurgen Klie, Toekendorf; Klaus Wellendorf, Kitzeberg, both of Fed. Rep. of Germany

[73] Assignee: Rudolf Hell GmbH, Fed. Rep. of Germany

[21] Appl. No.: 380,662

[22] PCT Filed: Sep. 10, 1980

[86] PCT No.: PCT/DE80/00133
§ 371 Date: May 4, 1982
§ 102(e) Date: May 4, 1982

[87] PCT Pub. No.: WO82/00902
PCT Pub. Date: Mar. 18, 1982

[51] Int. Cl.³ .............................................. H04N 1/46
[52] U.S. Cl. ..................................................... 358/80
[58] Field of Search ........................ 358/80, 75, 78, 76

[56] References Cited

U.S. PATENT DOCUMENTS

| | | | |
|---|---|---|---|
| 3,647,295 | 3/1972 | Dobouney | 358/80 |
| 3,848,856 | 11/1974 | Reeber et al. | 358/76 |
| 3,972,066 | 7/1976 | Seki et al. | 358/76 |
| 4,060,829 | 11/1977 | Sakamoto | 358/80 |
| 4,204,223 | 5/1980 | Gast et al. | 358/80 |
| 4,236,174 | 11/1980 | Gall | 358/22 |
| 4,285,009 | 8/1981 | Klopsch | 358/76 |
| 4,307,962 | 12/1981 | Jung | 356/405 |

FOREIGN PATENT DOCUMENTS

1400806 7/1975 United Kingdom .
2050106 12/1980 United Kingdom .

Primary Examiner—Michael A. Masinick
Assistant Examiner—Erin A. McDowell
Attorney, Agent, or Firm—Hill, Van Santen, Steadman & Simpson

[57] ABSTRACT

The invention relates to a method for improving the delineation in color image reproduction by means of a partial, electronic retouch. The color values of the individual color separations gained by means of image point-wise, trichromatic color image scanning and digitization are deposited in a storage medium (1). In order to improve the delineation, the color values of a color separation are altered image point-wise by means of selectable quotas of the image point-wise allocated color values of at least one other color separation. The quotas of the color values respectively represent the smallest amount of change for the color values of the color separation to be partially retouched. A retouch factor is determined for each color value of an image point to be retouched which is marked by the retoucher by means of the coordinate pen (51) of a coordinate identifier device (50; 51; 52), said retouch factor specifying the degree of retouch as a plurality of the change amounts to be added per image point. Locus-dependent correction values for the color values of the color separation to be retouched are calculated from the change amounts and from the retouch factors. For the purpose of visual control, the unretouched or retouched image is displayed on a monitor (2).

14 Claims, 7 Drawing Figures

METHOD AND CIRCUIT ARRANGEMENT FOR PARTIAL CORRECTION OF THE DELINEATION IN COLOR IMAGE REPRODUCTION

TECHNICAL FIELD

The invention relates to electronic reproduction technology, particularly to the production of corrected color separations and relates to a method for the partial correction of the delineation, and also relates to a circuit arrangement for the implementation of the method.

UNDERLYING PRIOR ART

In electronic color reproduction, three primary measured color value signals are gained in a color scanner by means of point-by-point and line-by-line opto-electronic scanning of colored masters and by means of spectral color dissection, said measured color value signals representing the color components red, green and blue of the scanned image points. A color correction computer corrects the measured color value signals according to the regularities of subtractive color mixture and generates the color separation signals which are a measure for the amounts of printing ink required in the later printing.

The color separation signals are deposited in a storage medium as digital color values in order, if need be, to record the color separations at a later point in time or at some other locations or, on the other hand, in order to combine the color values of different individual masters into a data set according to a layout plan, said data set corresponding to an overall page. In order to record the color separations, the color values of the individual masters or of the overall page are read out of the storage medium, are converted back into analog color separation signals and are supplied to write lamps as recording elements whose intensities are modulated by the appertaining color separation signals. The write lamps illuminate a recording medium in the form of films point-by-point and line-by-line, said films, after being developed, representing the desired rastered or unrastered color separations "yellow", "magenta", "cyan" and "black" for producing printing forms.

In the reproduction process, subsequent partial retouches (color value and/or tint value corrections) are frequently necessary, whether it be in order to optimize the correction accomplished in the color correction computer or, on the other hand, in order to take editorial changes and clients' wishes into consideration. Whereas the correction of a color undertaken by means of the color correction computer is effective everywhere where this color occurs in the master or in the image to be reproduced, it is desirable to limit such a retouch to selectable, topically limited image areas. Added thereto is that the correction influence within the image areas to be retouched should also frequently be bleeding, i.e., gradually increasing or decreasing.

A typical retouch job which is carried out in the color separation is the partial improvement of the delineation, i.e., working out finer gradations of the tint value. This retouch job is involved and time-consuming and requires great experience if a bleeding delineation is to be achieved within the image surface to be retouched.

A method is already known from the German No. OS 24 30 762 in which subsequent color corrections can be executed in selected image areas by means of changing the stored image information. Using a coordinate identification device, an operator determines the coordinates of the image points in the picture to be corrected, whereby the address-wise access to the stored image information is created. The operator then inputs the desired correction amounts into a computer over the keys of an operating unit, said computer converting the stored image information into the altered image information by means of evaluation with multiplicative or additive values.

Although color corrections are achieved with the known method by means of inputting individual correction amounts, a method with which a finer gradation of tint value can be executed in order to improve the delineation in an image is not specified.

Moreover, the known method is hardly suited for producing the bleeding retouches with gradually increasing or decreasing influence frequently desired in practice, this being viewed as a considerable disadvantage. Added thereto is that the laid-open application does not disclose how the described method is to be implemented in detail.

DISCLOSURE OF THE INVENTION

It is therefore the object of the invention to specify a method and a circuit arrangement for the correction of the delineation in color image reproductions with which, in particular, bleeding corrections and retouches can be executed.

The object is inventively achieved in that, for the color values (Y, M, C, K) of a color separation to be retouched, locus-dependent correction values ($Y_R$, $M_R$, $C_R$, $K_R$) are derived image point-by-image point from the image point-wise allocated color values (Y, M, C, K) of at least one color separation which is not to be retouched; and in that the color values (Y, M, C, K) of the color separation to be retouched which are to be corrected are changed by means of the topically allocated correction values ($Y_R$, $M_R$, $C_R$, $K_R$) in order to obtain the corrected color values (Y', M', C', K').

In an advantageous manner, locus-dependent color increments ($\Delta Y$, $\Delta M$, $\Delta C$, $\Delta K$) are derived image point-wise from selectable portions of the color values (Y, M, C, K) of at least one color separation not to be retouched, said color increments respectively representing the smallest amount of change for the color value (Y, M, C, K) of an image point to be corrected in the color separation to be retouched. The image point coordinates (x,y) of the color values (Y, M, C, K) to be corrected are identified and, for the determination of the respective degree of correction, a retouch factor (r) is determined for each identified coordinate pair (x,y), said retouch factor (r) specifying the plurality of color increments ($\Delta Y$, $\Delta M$, $\Delta C$, $\Delta K$) to be summed for each correction value ($Y_R$, $M_R$, $C_R$, $K_R$). Retouch factors (r) and color increments ($\Delta Y$, $\Delta M$, $\Delta C$, $\Delta K$) belonging to one another in terms of image point are multiplied with one another in order to obtain the correction values ($Y_R$, $M_R$, $C_R$, $K_R$).

It is preferably provided that the digital color values (Y,M,C,K) are read out of the storage medium (1), are changed by the correction values ($Y_R$, $M_R$, $C_R$, $K_R$), and the corrected color values (Y', M', C', K') are re-deposited on the storage medium after conclusion of the retouch.

In a preferred manner, the image point coordinates (x,y) of the color values (Y, M, C, K) to be corrected are determined in a coordinate identification device (50, 51, 52) by means of marking the topically allocated points with a marking device (51), particularly with a coordinate pen.

It is proposed in an advantageous embodiment that the retouch factors (r) are determined from the plurality of contacts between the corresponding points and the marking device (51) of the coordinate identification device (50, 51, 52), whereby the marking device (51) is conducted like a retouch brush over that area of the coordinate identification device (50, 51, 52) which corresponds to the area of the color separation to be corrected. Alternatively, the retouch factors (r) are determined from the pressure of the marking device (51) on the corresponding points of the coordinate identification device (50, 51, 52).

Another alternative provides that the retouch factors (r) are determined from the dwell time of the marking means (51) on the corresponding points of the coordinate identification device (50, 51, 52).

The retouch factors (r) are increased by an amount (intensification of the retouch) or reduced (cancellation of the retouch) with each contact or, respectively, are increased given a rise in pressure and are reduced given a drop in pressure or, respectively, are increased or reduced by an amount corresponding to the respective dwell time.

In an advantageous manner, the unretouched or retouched color separation or, respectively, the unretouched or retouched color image (original) are displayed on a monitor (2) for visual control, a displaceable light mark (31) is faded into the picture screen (3), and the movement of the light mark (31) is synchronized with the movement of the marking means (51) of the coordinate identification device (50, 51, 52).

Preferably, the digital color values (Y, M, C, K) of the individual color separations are loaded out of the storage medium (1) into an image repetition memory (7) and the image repetition memory (7) is cyclically read out for point-by-point recording on the monitor (2).

It is provided that the identified retouch factors (r) are overwritten image point-wise into a retouch memory (49) and that the retouch memory (49) is read out synchronously with the image repetition memory (7) for the image point-wise allocation of color values (Y, M, C, K) and correction values ($Y_R$, $M_R$, $C_R$, $K_R$).

An advantageous improvement is that the retouch factors (r) altered by the correction operation are respectively overwritten into the retouch memory (49) in a blanking interval of the image recording.

The image point coordinates (x,y) of the marked points are preferably deposited list-wise in the sequence of their detection, the image point coordinates (x,y) are called in by pairs in the reverse sequence, and the corresponding retouch factors (r) are changed in the retouch memory (49) by steps in order to be able to cancel the accomplished retouch step-wise and contour-true.

A further improvement consists therein that the overall correction can be reversed by means of cancelling the retouch memory (49).

An advantageous further development provides that the marking means (51) simultaneously identifies the image point coordinates (x,y) of a plurality of color values (Y, M, C, K) to be corrected and that said color values are simultaneously changed in accord with an enlarged brush surface.

The enlarged brush surface is preferably indicated by means of a correspondingly enlarged light spot (31).

For the purpose of further improvement, it is proposed that the image area to be retouched be limited by means of an electronically generated mask.

An advantageous arrangement for implementing the method consists of a color generator (38) for the formation of the color increments ($\Delta Y$, $\Delta M$, $\Delta C$, $\Delta K$), of a retouch generator (39) for the formation of the retouch factors (r) for the color values (Y, M, C, K) to be corrected, of a correction value generator (40) connected to the color generator (38) and to the retouch generator (39) for the formation of the correction values ($Y_R$, $M_R$, $C_R$, $K_R$), and of logic stages (15, 16, 17, 18) following the image repetition memory (7) in the color channels for changing the color values by means of the correction values.

The retouch generator (39) is preferably constructed of a coordinate identification device (50, 51, 52) for determining the image point coordinates (x,y) of the color values to be corrected, of an evaluation circuit (48) connected to the coordinate identification device (50, 51, 52) for the formation of the retouch factors (r) for each identified pair of image point coordinates, and of a retouch memory (49) connected to the evaluation circuit (48).

BRIEF DESCRIPTION OF THE DRAWINGS

In the following, the invention is described in greater detail on the basis of FIGS. 1 through 6. There are shown.

BEST MANNER OF EXECUTING THE INVENTION

Figure 1:
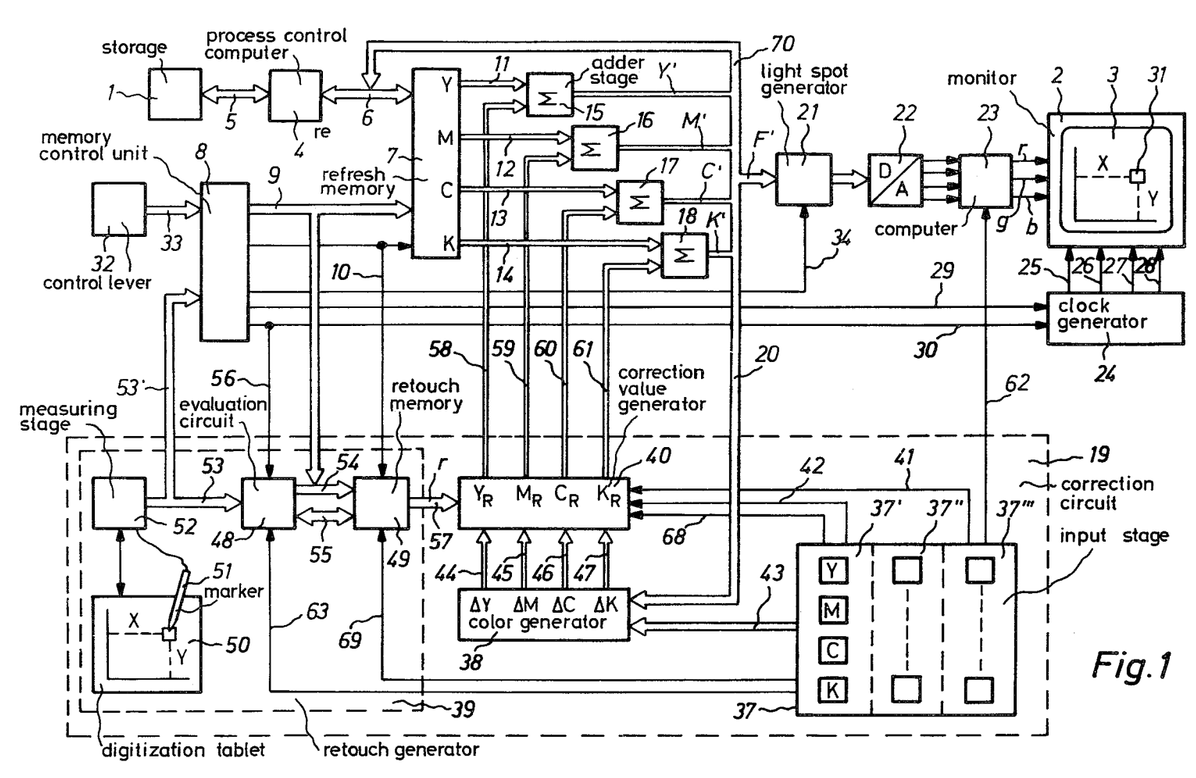
FIG. 1 a circuit arrangement for partial electronic retouch in color image reproduction.

FIG. 1 shows the fundamental structure of a circuit arrangement for partial electronic retouch (retouch station) in color image reproduction.

In the sample embodiment, a storage medium 1 (magnetic tape; magnetic disk) contains the digital color values for the color separations "yellow" (Y), "magenta" (M), "cyan" (C) and "black" (K) of an image to be reproduced which have already been corrected in a color scanner.

Let, for example, the color values have a word length of 8 bit, whereby 254 gray scales can be distinguished between "black" (0) and "white" (255). The image to be reproduced can be both a single image as well as an assembled printing page. The color values of a single image were previously gained in a color scanner by means of point-by-point and line-by-line trichromatic scanning of a master, by means of color correction and analog-to-digital conversion of the color separation signals. The color values of an entire printing page arose, for example, in a device for electronic page layout according to the GBLP No. 1,407,487 (German OS No. 21 61 038) by means of combination of the corrected single image color values according to a layout plan. Uncorrected color values can also be deposited in the storage medium 1.

Before recording the color separations on film material by means of a color scanner (offset printing) or before the production of the printing forms by means of a graving machine (rotogravure), the images or, respectively, color values to be reproduced are to be subjected to a partial electronic retouch under visual control in order to improve the delineation in general and/or in order to take subsequent changes desired by the client into consideration.

A color monitor 2 on whose picture screen 3 a picture of 512×512 image points can be recorded is provided for the visual control. The color values required for the display of a color separation or of the color image to be retouched are selected or calculated from the overall data set of the storage medium 1 by means of a process control computer 4 and are transmitted from there into an image repetition memory 7 image point-by-image point over the data buses 5 and 6. According, the image repetition memory 7 exhibits a capacity of 512×512 memory locations of 8 bit each for each color separation.

Figure 4:
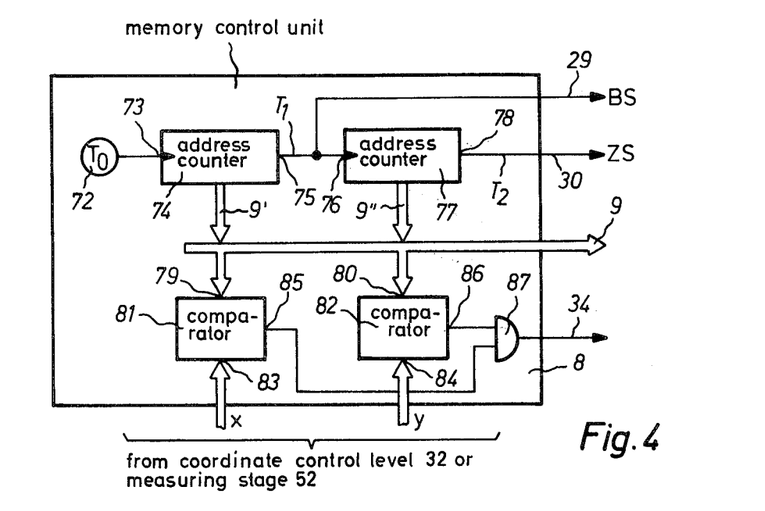
FIG. 4 a sample embodiment of a memory control unit.

In order to produce a still picture on the picture screen 3 of the color monitor 2, a memory control unit 8 calls the XY addresses of the image repetition memory 7 in cyclically over an address bus 9. FIG. 4 shows a sample embodiment of a memory control unit.

The stored digital color values F (Y, M, C, K) are read out with a read clock on a line 10 line-by-line and, within each line, image point-by-image point and are forwarded over data lines 11, 12, 13 and 14 to digital logic stages 15, 16, 17 and 18 which are designed in the sample embodiment as digital adder stages.

Topically assigned correction values $F_R$ ($Y_R$, $M_R$, $C_R$, $K_R$) are added to the read-out digital color values F in the digital adder stages 15, 16, 17 and 18 in order to obtain the retouched digital color values F' (Y', M', C', K'), whereby a delineation intensification is achieved by means of increasing the correction values and a delineation cancellation is achieved by means of reducing the correction values.

The corrections values $F_R$ are generated in a correction circuit 19.

The retouched, digital color values F' proceed over a data bus 20 and a light spot generator 21 to a digital-to-analog converter 22 and are converted there into four analog color separation signals. Upon consideration of the parameters of the later process printing, a following print simulation computer 23 converts the four color separation signals into the three drive signals r, g and b for the color monitor 2 in such manner that the display on the picture screen 3 conveys the same polychrome impression as the process printing itself. Such a print simulation computer is extensively described, for example, in the GBLP No. 1,540,525 (German OS No. 26 07 623).

The recording ensues according to line interlace in order to obtain a flicker-free image. In accord with the technique standard in video, a clock generator 24 produces the horizontal and vertical deflection signals required for the image recording on lines 25 and 26 and the line start pulses and the picture start pulses on lines 27 and 28. Over the line 29 and 30, the memory control unit 8 supplies horizontal and vertical synchronizing pulses to the clock generator 24 so that the image recording is synchronized with the read operation from the image repetition memory 7.

In order to mark an image point or image point area in the displayed picture, a light spot 31 is faded into the picture screen 3 and said light spot 31 can be shifted by prescribing X/Y coordinates over an address line 33 by means of a mechanical coordinate control lever 32. The prescribed coordinates (addresses) are compared in the memory control unit 8 to the continuously called-in addresses and, given identity, a command (light spot) is generated on a line 34, appears precisely at that point in time at which the electron beams of the color monitor 2 sweep the selected image point or image point area on the picture screen surface. The command "light spot" activates the light spot generator 21 which briefly generates equal-value r, g, b drive signals for the color monitor 2. By so doing, the electron beam generating systems of the color monitor 2 are simultaneously switched on with the same luminance and the "white" light spot 31 is produced.

In the following, the correction circuit 19 is to be described, said correction circuit 19 essentially consisting of an input stage 37, of a color generator 38, of a retouch generator 39 and of a correction value generator 40.

In a color separation to be retouched, the locus-dependent correction factor $F_R$ (x,y) is given for each image point with the coordinates x and y by the general equation (1) or is given for the individual color separations by the equations (2):

$$F_R(x,y) = \Delta F(x,y) \cdot r(x,y) \tag{1}$$

$$Y_R(x,y) = \Delta Y(x,y) \cdot r(x,y)$$

$$M_R(x,y) = \Delta M(x,y) \cdot r(x,y)$$

$$C_R(x,y) = \Delta C(x,y) \cdot r(x,y) \tag{2}$$

$$K_R(x,y) = \Delta K(x,y) \cdot r(x,y)$$

In the equations, $\Delta F \cdot (\Delta Y; \Delta M; \Delta C; \Delta K)$ is a locus-dependent or, respectively, image point-dependent color increment which represents the respectively smallest amount of change for the color values F.

The color increments $\Delta F$ are topically and amount-wise dependent on the color values F of at least one color separation not to be retouched according to the equation:

$$F(x,y) = F(x,y) \cdot a_F \tag{3}$$

whereby "$a_F$" are freely selectable quota factors. The color increments $\Delta F$ are gained in the color generator 38.

In the equations, "r" is a locus-dependent multiplier referred to as the retouch factor shared by all color separations with which the appertaining color increment $\Delta F$ is to be multiplied in order to obtain the correction value $F_R$. The retouch factors r are generated in the retouch generator 39.

The individual components of the correction circuit 19 are now to be described in greater detail.

Input Stage 37

The input stage 37 exhibits three keysets 37', 37" and 37''', whereby four color separation keys "Y", "M", "C" and "K" are provided in the keyset 37'.

With the assistance of these color separation keys, that color separation (color separation to be retouched) whose delineation is to be corrected and that color separation or those color separations (color separation determining the color increment) is (are) selected as a function of which the correction is meant to ensue.

A corresponding command proceeds over a line 41 to the correction value generator 40 for the selection of the color separation to be retouched. This command sees to it that it is only the correction values $F_R$ for the color separation to be retouched which are through-connected from the correction value generator 40 to the appertaining adder stages 15, 16, 17 or 18, whereas all other correction values are zero.

For the selection of the color separations which are to determine the color increments $\Delta F$, a command proceeds over a line 42 to the correction value generator 40 with which the corresponding color increments incoming over the data lines 44 through 47 are selected.

A ten-key keyboard with which the quota factors are input is provided in the keyset 37″. The quota factors $a_F$ are forwarded to the color generator 38 over the data bus 43.

The keyset 37‴ exhibits a multitude of operating keys with which various functions of the correction circuit 19 can be actuated.

Color Generator 38

Figure 5:
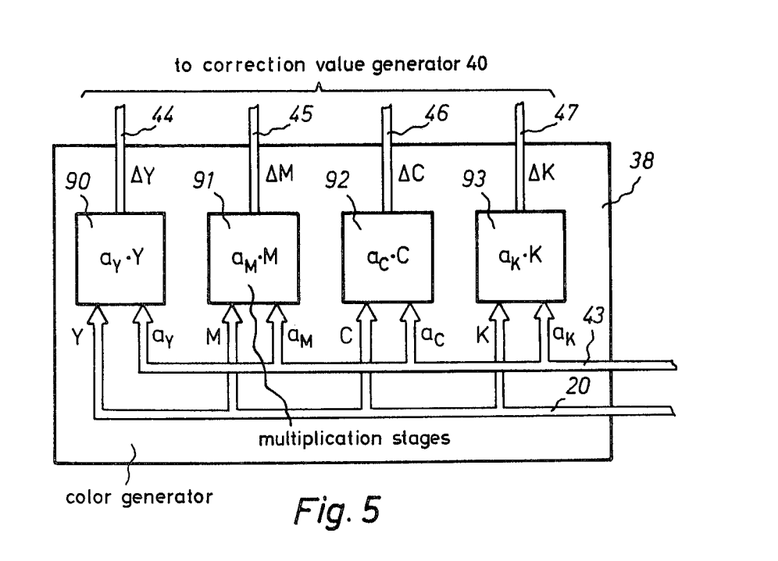
FIG. 5 a sample embodiment of a color generator.

In the color generator 38, the color increments $\Delta F$ for the color separation to be retouched are calculated image point-wise according to the specified equation $\Delta F(x,y) = F(x,y) \cdot a_F$ from the selected quota factors $a_F$ and from the color values F of the topically allocated image points of the uncorrected color separations determining the color increments incoming over the data bus 20. The color increments $\Delta F$ are forwarded over the data lines 44 through 47 to the correction value generator 40. A sample embodiment of the color generator 38 is shown in FIG. 5.

Retouch Generator 39

The retouch generator 39 comprises a coordinate identification device for the image point coordinates (x,y) of the color values to be retouched, an evaluation circuit 48 for calculating the locus-dependent retouch factors r (x,y) and a retouch memory 49.

In the sample embodiment, the coordinate identification device consists of a digitization tablet 50, a hand-held coordinate pen 51 or some other marking device, and of a measuring stage 52 for the coordinate definition of the points covered by the coordinate pen 51 on the digitization tablet 50.

Such coordinate identification devices are commercially available (for example, Summagraphics, 35 Brentwood Ave., Fairfield, USA) and known to one skilled in the art, so that a detailed description is superfluous.

However, any other coordinate identification device (for example, coordinate lever, rolling ball, etc.) or, in case less precision can be allowed, a traditional light pen can also be employed.

In the coordinate identification device of the sample embodiment, the image point coordinates are identified with a significantly higher resolution than the resolution of the stored and displayed image consisting of 512×512 image points, whereby higher precision can be attained. The image point coordinates measured in the coordinate identification device are converted in the measuring stage 52 into the possible 512×512 coordinates (equals addresses) and are output over an address bus 53.

For the purpose of monitoring the retouch, the movement of the light spot 31 on the picture screen 3 is synchronized with the movement of the coordinate pen 51 on the digitization tablet 50. To that end, the image point coordinates or, respectively, addresses measured in the coordinate identification device are transmitted over the address bus 53′ to the memory control unit 8 and are compared there to cyclically called-in addresses of the image repetition memory 7. Given equality of address, the command "light spot" again arises on the line 34 and, as already described, the light spot generator 21 generates the movable light spot 31 on the picture screen 3.

In order to determine the retouch factors r (x,y) for each image point having the image point coordinates x and y and to be retouched, the coordinate pen 51 is used by the operator as a "retouch brush" and is repeatedly conducted in lines lying next to one another over that area of the digitization tablet 50 which corresponds to the image area to be retouched, whereby, in the selected sample embodiment, the plurality of contacts per image point is a measure for the desired delineation intensification or delineation cancellation in this image point.

The coordinates x and y of the points contacted or swept by the coordinate pen 51 are continuously transmitted over the address bus 53 to the evaluation circuit 48 and are retained there listwise in a working memory. The capacity of the working memory is large enough that, for example, the pairs of coordinates of the image points of the last 200 points of contact can be deposited.

Figure 2A:
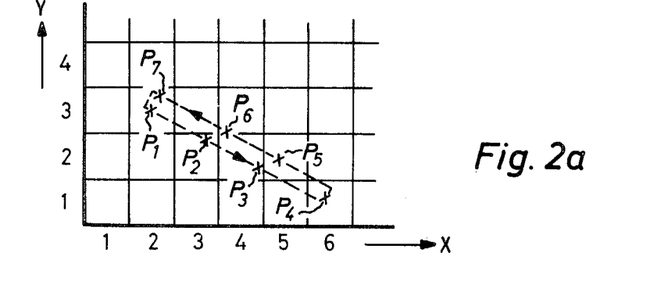
FIG. 2 graphic illustrations for determining the retouch factors.

In order to illustrate the determination of the retouch factors, FIG. 2a shows a section of the digitization tablet 50. Beginning at a specific point in time which, for example, is characterized by the blanking interval of the image recording, let the coordinate pen 51 have executed a back-and-forth motion from point $P_1$ (2,3) over the point $P_4$ (6,1) back to point $P_7$ (2,3). The points P respectively mark the point in time of a coordinate identification in the measuring stage 52.

Figure 2B:
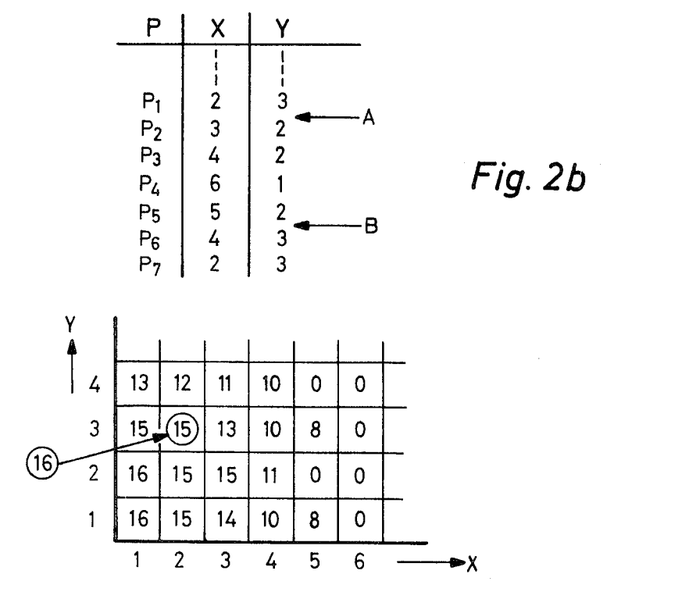

FIG. 2b shows the list of contacted image point coordinate pairs in the sequence of the contactings. Let the end of a blanking interval be marked by an arrow A and the beginning of the following blanking interval be marked by an arrow B. The determined retouch factors are overwritten into the retouch memory 49 in the blanking interval. To that end, FIG. 3c shows the corresponding section of the retouch memory 49 with a momentary, topical distribution of the determined retouch factors r before the blanking interval.

With the beginning of the blanking interval of the image recording marked by the arrow B, the first image point coordinate pair (2,3) in the list is called in and the appertaining address of the retouch memory 49 is selected over an address bus 54. The retouch factor r stored under this address is read out over a data bus 54, is increased by a specific amount, for example, by "1" (intensification of the delineation) or is reduced by "1" (cancellation of the delineation) and is rewritten into the retouch memory 49 over the data bus 55. In the selected example, an intensification of the delineation is assumed, so that the corresponding retouch factor "15" is increased by "1" to "16" and is rewritten.

The following image point coordinate pairs of the list are successively called in and the described measures are analogously executed. After the retouch factors have been overwritten in the retouch memory 49, the working memory of the evaluation circuit 48 is cancelled.

In accord with the assumed 512×512 image points of the displayed image, the retouch memory 49 has a capacity of 512×512×8 bit, so that 255 contactings of the coordinate pen 51 can be counted and stored per image point (coordinate pair).

The blanking interval of the image recording is signalized to the evaluation circuit 48 by the memory control unit 8 over a line 56. The read-out of the retouch factors r from the retouch memory 49 is interrupted during the frame blanking. The type of overwriting has the advantage that the retouch changes are already visible in the new image without the picture presentation itself being disrupted as a result of the retouch operation.

In that the operator employs the coordinate pen 51 both for coordinate identification as well as for the determination of the change amounts, any desired gradual changes of the delineation can be advantageously achieved in the manner of conventional brush retouching. Since the manual guidance of the coordinate pen corresponds to that of the traditional retouch brush, the retoucher, who is accustomed to working with the retouch brush, can execute the electronic delineation retouch without being retrained.

Alternatively, the retouch factors can also be determined on the basis of the mechanical pressure with which the coordinate pen 51 is pressed against the digitization tablet 50 or can be determined from the dwell time of the coordinate pen 51 on the corresponding points of the digitization tablet 50.

Correction Value Generator 40

The retouch factors read out of the retouch memory 49 are forwarded over a data bus 57 to the correction value generator 40 in which they are multiplied according to the specified equation (1) by the color increments $\Delta F$ continuously calculated in the color generator 38 for the purpose of obtaining the correction values $F_R$.

The color increments participating in the calculation of the corresponding correction values are selected with the instruction on the line 42. In general, the color increments of one color separation will participate. However, the color increments of a plurality of color separations can also be employed for the calculation of the correction values, whereby the mixing ratio is determined by the quota factors.

Figure 6:
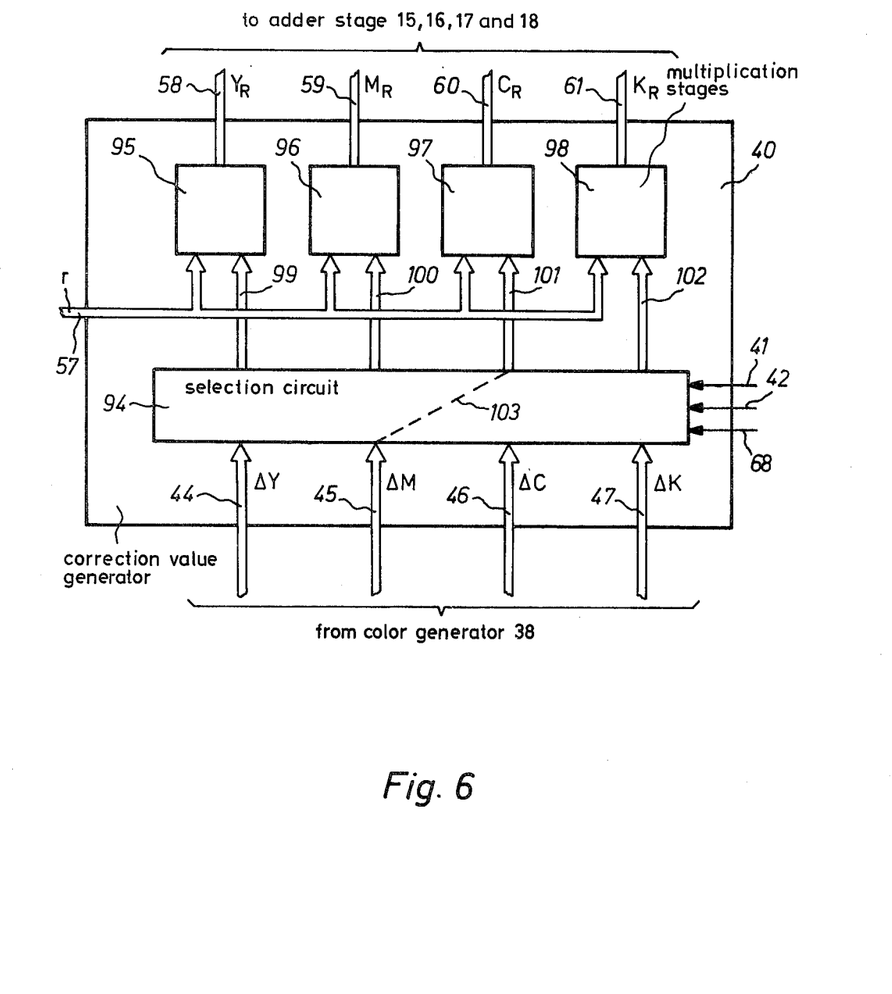
FIG. 6 a sample embodiment of a correction value stage.

Of the identified correction values $F_R$, only the correction values of the color separation to be retouched are forwarded, controlled by the instruction on the line 41. FIG. 6 shows a sample embodiment of the correction value generator.

In order to illustrate the manner of functioning of the retouch station, the partial and gradual improvement of the delineation, i.e., the retouching-in of finer tonal gradations in a color separation, is to be explained on the basis of a typical example. Skin color is essentially determined by the color separations "magenta" and "yellow", but the delineation, in contrast thereto, is determined by the color separation "cyan". Therefore, in order to improve the delineation, the color separation "cyan" is retouched, in that inventively selectable portions of that color separation or of those color separations which already exhibit the best delineation are partially (for example, in the face area) mixed bleeding into the color separation "cyan", being mixed in with topical precision and in accord with the desired effect. Let the color separation "magenta" exhibit the best delineation, so that this supplies the color increment. In this case, the correction values $M_R$, $Y_R$ and $K_R$, controlled by the command on the line 41 to the correction value generator 40, are switched off onto the data lines 58, 59 and 61. The unaltered color values Y, M and K proceed over the data bus 20 into the color generator 38 in which the locus-dependent color increments $\Delta Y$, $\Delta M$ and $\Delta K$ are continuously formed according to the specified equation (3) from the color values Y, M and K as well as from the selected quota factor $a_M$ for the color values of the color separation "magenta". The color increments proceed over the data lines 44, 45 and 47 to the correction value generator 40. If need be, the color values of the color separation "cyan" which are not required can be disconnected in the color generator 38.

Controlled by the instruction on the line 42, the color increment $\Delta M$ is selected in the correction value generator 40 according to the selected example and the corresponding correction value $C_R = r \cdot \Delta M$ is formed for the color separation "cyan" to be retouched.

The correction values $C_R$ proceed over the data line 60 to the adder 17 and correct the color values C of the color separation "cyan" there according to the equation $C' = C + C_R$.

The image repetition memory 7 and the retouch memory 49 are cyclically and synchronously addressed over the common address bus 9, whereby color values and retouch factors allocated image point-wise are simultaneously read out and processed.

The color increments and the correction values are likewise formed synchronously so that the color values of the image points of the color separation "cyan" are altered at every moment as a function of the image point-wise allocated color values of the color separation "magenta". With the assistance of the coordinate pen 51, the retoucher determines the area to be retouched in the color separation "cyan" and the degree of the retouch per image point which is required for the desired gradual or bleeding improvement of the delineation. Thereby, the quota factor $a_M$ which determines the percentile share of the color separation "magenta" and which is mixed to the color separation "cyan" with topical precision each time the digitization tablet 50 is contacted by the coordinate pen 51 can be altered in accord with the requirements.

For the purpose of visual control, the color separation to be retouched is displayed in black/white on the picture screen 3 of the color monitor 2. A changeover switch (not illustrated) which is actuated by an instruction on a line 62 is situated in the print simulation computer 23. The changeover switch simultaneously applies the appertaining color separation signals to all color channels or to the black channel. Thereby, it is seen to that the three drive signals for the color monitor 2 are of equal size in terms of amount.

The display of the color separation to be retouched can ensue on a black/white monitor. When the overall effect of the retouch is to be judged on the basis of the color picture, the corresponding instruction on the line 62 is cancelled.

As already mentioned, the input stage 37 exhibits a keyset 37''' with a plurality of operating keys with which various functions can be selected before, during and after the retouch. These functions are now to be explained in detail.

Surface-Wise Resolution

The finest surface-wise resolution which can be achieved with the coordinate identification device amounts to one image point. In order to be able to retouch larger surfaces more quickly, the plurality of image points covered with each touch of the coordinate pen 51 can be increased. In this case, it is not only the retouch factor of the image point contacted by the coordinate pen 51 but, rather, the retouch factors of the image points surrounding said image point which are altered, whereby, so to speak, the "surface of the retouch brush" is enlarged. For example, the brush surface can be rectangularly or circularly selected.

Figure 3:
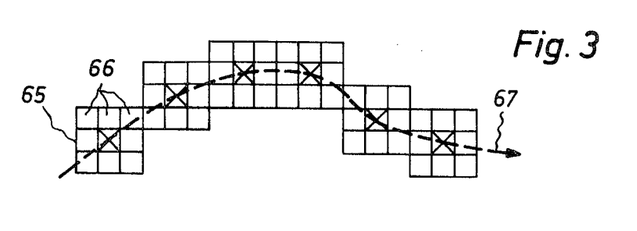
FIG. 3 a retouch surface identified with the coordinate pen.

In order to enlarge the brush surface, the operator activates an operating key "brush surface", whereupon a control signal is forwarded over a multiple line 63 to the evaluation circuit 48. In this case, all retouch factors of the brush surface are simultaneously calculated in the evaluation circuit 48. Size and shapes of the brush surface are indicated to the operator on the picture screen 2 of the color monitor 3 by a corresponding-shaped and enlarged light spot 31. For purposes of illustration, FIG. 3 shows the disposition of the image points which are respectively simultaneously retouched given an enlarged brush surface 65 which, for example, consists of 3×3 image points 66. The line 67 represents a random movement of the coordinate pen 51.

Contour Mask

When an exactly defined retouch area of the image is to be corrected, the operator must guide the coordinate pen very carefully along the contours of the retouch area. This job can be facilitated in an advantageous manner when the retouch area is geometrically limited by an electronic contour mask. In this case, the careful circumscription of the retouch area with the coordinate pen is eliminated, since the correction is automatically limited to the retouch area.

Presentation of the Original Image

In order to be able to evaluate the color picture at a random stage of the retouch, it is advantageous to briefly record the unretouched original picture on the picture screen 3 of the color monitor 2. To that end, the operator presses the operating key "original" of the input stage 37. A corresponding instruction on a line 68 to the correction value generator 40 disconnects the correction values $F_R$ from the data lines 58 through 61, whereby the color values F of the original read out from the image repetition memory 7 are recorded without influence 15 as a result of the correction values $F_R$.

Erasing the Retouch

If the delineation intensification was too great, it can again be reduced in that the operator first actuates an operating key "erase" in the input stage 37 and then proceeds over the appertaining image location with erasing movements of the coordinate pen 51. In this case, an instruction on the multiple line 63 sees to it that the retouch factors in the evaluation circuit 48 and, correspondingly, in the retouch memory 49 are reduced by the required amounts.

If the erasure of the retouch effect of one or more motions of the coordinate pen is desired, the stored list of image point coordinate pairs and allocated retouch factors is expediently worked off in reverse in the evaluation circuit 48, whereby the retouch is retracted contour-true without renewed movement of the coordinate pen.

Cancellation of the Retouch

The entire retouch can be cancelled in that the retouch memory 49 is cancelled. To that end, the operator presses an operating key "cancel" in the input stage 37 and a corresponding instruction on the line 69 cancels the memory content.

When the retouch of a sub-region has been concluded and one would like to input a new quota factor $a_F$ for a different sub-region, the retouched color values F' are previously loaded into the image repetition memory over the return data bus 70 and a new sub-retouch can begin.

When, finally, the entire retouch has been completed, the retouched color values F' are reinscribed on the storage medium 1 by means of the process control computer 4.

FIG. 4 shows a sample embodiment of the memory control unit 8 of FIG. 1.

The memory control unit 8 contains a clock generator 72 which counts a counting clock sequence $T_0$ into an X-address counter 74 over a counting input 73. The X-address counter 74 is a 9 bit binary counter and calls in the X-addresses of the image repetition memory 7 from 0 through 511 over an address bus 9'. After respectively 511 counted clocks, a clock $T_1$ appears at the output 75 of the address counter 74, said clock $T_1$ being counted into a Y-address counter 77 over a counting input 76. The Y-address counter 77 is likewise a 9 bit binary counter and calls the corresponding Y-addresses of the image repetition memory 7 from 0 through 511 in over an address bus 9''. The address buses 9' and 9'' are combined into the address bus 9 which is connected to the image repetition memory 7. At its output 78, the Y-address counter 77 likewise generates a clock $T_2$ after 511 clocks have been counted in. The line start pulses (ZS) and the picture start pulses (BS) on the lines 29 and 30 for the picture recording are derived from the clocks $T_1$ and $T_2$.

The address buses 9' and 9'' are respectively connected to the first comparison inputs 79 and 80 of the comparators 81 and 82. The second comparison inputs 83 and 84 of the comparators 81 and 82 are charged with X/Y coordinates which can be prescribed by means of the coordinate control lever 32 for displacing the light spot 31 or which are generated by the measuring stage 52 for the purpose of synchronizing the light spot 31 with the movement of the coordinate pen 51. The signal outputs 85 and 86 of the comparators 81 and 82 are linked to one another over an AND gate 87. Given equality of the addresses, the signal "light spot" appears on the line 34.

FIG. 5 shows a sample embodiment of the color generator 38. It consists of four digital multiplication stages 90, 91, 92 and 93 for the formation of the four color increments $\Delta Y$, $\Delta M$, $\Delta C$ and $\Delta K$ from the color values Y, M, C and K and the corresponding quota factors $a_Y$, $a_M$, $a_C$ and $a_K$.

The color values are supplied to the multiplication stages 90, 91, 92 and 93 over the data bus 20 and the quota factors are supplied over the data bus 43.

FIG. 6 shows a sample embodiment of the correction value generator 40 which consists of a selection circuit 94 and of four multiplication stages 95, 96, 97 and 98. Controlled by the instruction on the line 42, the color increments required for the calculation of the correction values are selected in the selection circuit 94 and, as a result of the instruction on the line 41, are through-connected to the appertaining multiplication stage 95 through 98 over one of the data buses 99 through 102. In the selected example, in which the color separation "cyan" is retouched as a function of the color separation "magenta", the selection circuit 94 connects the corresponding data buses 45 and 101, this being indicated by means of a broken line 103. If need be, a mixing of the color increments can ensue in the selection circuit 94 when the retouch is to ensue as a function of a plurality of color separations.

The correction values are then formed in the appertaining multiplication stage 95 through 98 from the retouch factors on the data bus 57 and from the selected color increments, in the selected example, thus, the correction value $C_R$ is formed in the multiplication stage 97 from the retouch factors r and the color increments $\Delta M$.

For the purpose of displaying the unretouched picture on the picture screen 3 of the color monitor 2 in the circuit arrangement according to FIG. 1, the data buses 99 through 102, controlled by the instruction on the line 68, are applied to grounded potential, as a result of which, as already described, the correction values become zero.

Commercial Utilization

The invention is advantageously employed in the entire field of electronic reproduction technology, particularly in the field of color image reproduction by means of electronic color scanners and color reproduction systems for the production of retouched and corrected printing forms in the form of color separations or printing cylinders.

We claim:

1. The method for partial improving the delineation of color images by retouching, in which color values obtained by point-by-point and trichromatic scanning of color originals are digitized and the digital color values of the individual color separations are stored in a storage medium, and in which the stored color values are corrected by color correction values so as to obtain retouched color values, comprising the steps of:
    (a) identifying the pairs of locus-coordinates of the image points to be retouched in the color image by marking the locationally allocated points in a coordinate identification device which is a digitizer with a marking means of said device, such as a coordinate pen cursor;
    (b) generating locus-dependent color increments values ($\Delta Y$, $\Delta M$, $\Delta C$, $\Delta K$) image point-wise for a color separation to be retouched in delineation from selectable portions of the color values (Y, M, C, K) of at least one other color separation which has a better delineation, said color increments values ($\Delta Y$, $\Delta M$, $\Delta C$, $\Delta K$) representing smallest amount of correction for said color values (Y, M, C, K) per retouching step;
    (c) during coordinate identification simultaneously determining the desired retouch strength of the delineation for each image point to be retouched by generating a retouch factor (r) for each identified pair of locus-coordinates with said marking means, guiding said marking means similar to a retouch brush over that area of the coordinate identification device which corresponds to the area of the color image to be retouched in delineation, said retouch factor (r) representing a plurality of color increment values ($\Delta Y$, $\Delta M$, $\Delta C$, $\Delta K$) which are to be summed or to be subtracted to or from the color values (Y, M, C, K) at each image point which is to be retouched;
    (d) generating correction values ($Y_R$, $M_R$, $C_R$, $K_R$) for each image point which is to be retouched by multiplying the retouch factor (r) with the individual color increment values ($\Delta Y$, $\Delta M$, $\Delta C$, $\Delta K$); and
    (e) correcting said color values (Y, M, C, K) of the image points which are to be retouched by adding or subtracting said corresponding correction values ($Y_R$, $M_R$, $C_R$, $K_R$) in order to obtain corrected color values (Y', M', C', K') representing the retouched delineation in said color image.

2. The method according to claim 1 wherein the retouch factor (r) of an image point is generated by the number of contacts of said marking means with said corresponding point in said coordinate identification device, whereby the retouch factor (r) increases (intensification for positive retouching in delineation) or decreases (intensification for negative retouching in delineation) by an incremental amount on each contact.

3. The method according to claim 1 wherein the retouch factor (r) of an image point is generated by the pressure of the marking means on the corresponding point in said coordinate identification device, whereby the retouch factor (r) increases (intensification for positive retouching in delineation) or decreases (intensification for negative retouching in delineation) by an amount proportional to the pressure.

4. The method according to claim 1, wherein the retouch factor (r) of an image point is generated from the dwell time of said marking means on the corresponding point in said coordinate identification device, whereby the retouch factor (r) increases (intensification for positive retouching in delineation) or decreases (intensification for negative retouching in delineation) by an amount proportional to the dwell time.

5. The method according to claim 1, further comprising the steps of:
    (a) displaying said color original, said retouched color image or said unretouched or retouched color separation on a color monitor for visual control;
    (b) generating a moveable light mark on the screen of said color monitor; and
    (c) synchronizing the motion of said light mark with the motion of the marking means of said coordinate identification device, said light mark visibly indicating in said color original or said retouched color image the image points marked by said marking means.

6. The method according to claim 1 or 5 further comprising the steps of:
    (a) transferring the color values (Y, M, C, K) of the color image from said storage medium into an image refresh memory;
    (b) writing the generated retouch factors (r) of the image points to be retouched into a retouch memory;
    (c) reading out synchronously the retouch factors (r) from said retouch memory and the color values (Y, M, C, K) from said image refresh memory;
    (d) generating said correction values ($Y_R$, $M_R$, $C_R$, $K_R$);
    (e) correcting said read out color values (Y, M, C, K) by said generated correction values ($Y_R$, $M_R$, $C_R$, $K_R$) to obtain said retouched color values (Y', M', C', K'); and
    (f) converting said color values (Y, M, C, K) of said color original or said retouched color values (Y', M', C', K') of said retouched color image into control signals for said color monitor.

7. The method according to claim 6, wherein the generated retouch factors (r) are respectively written into the retouch memory during the blanking interval of said color monitor.

8. The method according to claim 1, further comprising the steps of:
   (a) storing the plurality of pairs of locus-coordinates in the sequence of their identification by said marking means of said coordinate identification devices;
   (b) calling up selected locus-coordinates from said plurality in reversed sequence; and
   (c) reducing the retouch factors (r) corresponding to said selected locus-coordinates, whereby the retouch strength achieved during the preceding retouching process within an area of said color image defined by said selected locus-coordinates is reduced true to the contours of said area.

9. The method according to claim 1, wherein the overall retouch process can be reversed by erasing said generated retouch factors (r).

10. The method according to claim 1, further comprising the steps of:
    (a) identifying simultaneously a plurality of locus-coordinates-pairs of the image points to be retouched with said marking means of said coordinate identification device; and
    (b) generating simultaneously a plurality of corresponding retouch factors (r); whereby the area retouched by said marking means is increased and a plurality of image points are retouched simultaneously.

11. The method according to claim 10, wherein the enlarged area is indicated by means of a correspondingly enlarged light mark.

12. The method according to claim 1, wherein the part of the color image to be retouched is limited by means of an electronically generated retouch mask.

13. Apparatus for partial electronic retouching of the delineation in color images in which color signals obtained by point-by-point and trichromatic scanning of color originals are digitized and the digital color values of the individual color separations are stored in a storage medium, comprising:
    (a) an image refresh memory (7) for the digital color values;
    (b) a color monitor (2) for displaying said color original or said retouched color image;
    (c) a color generator (38) for the formation of color incremental values ($\Delta Y$, $\Delta M$, $\Delta C$, $\Delta K$);
    (d) a retouch generator (39) for the formation of retouch factors (r) of the image points to be retouched in the color image;
    (e) a correction value generator (40) connected to the color generator (38) and the retouch generator (39) for formation of correction values ($Y_R$, $M_R$, $C_R$, $K_R$) from said color incremental values ($\Delta Y$, $\Delta M$, $\Delta C$, $\Delta K$) and said retouch factors (r); and
    (f) combining stages (15, 16, 17, 18) arranged in the color channels and connected to said image refresh memory (7), to said color monitor (2), to said correction value generator (40) and to said color generator (38) for the correction of the color values (Y, M, C, K) stored in said refresh memory (7) by means of said correction color values ($Y_R$, $M_R$, $C_R$, $K_R$) so as to obtain delineation retouch color values (Y', M', C', K').

14. Apparatus according to claim 13, wherein said retouch generator (39) consists of:
    (a) a coordinate identification device (50, 52) having marking means (51), particularly a cursor, for identifying the pairs of locus-coordinates of image points to be retouched;
    (b) an evaluation circuit (48) connected to said coordinate identification device (50, 52) for generating the retouch factors (r) from said pairs of locus-coordinates; and
    (c) a retouch memory (49) connected to said evaluation circuit (48) for storing said generated retouch factors (r).

* * * * *

UNITED STATES PATENT AND TRADEMARK OFFICE
CERTIFICATE OF CORRECTION

PATENT NO. : 4,486,772

DATED : December 4, 1984

INVENTOR(S) : Klie et al

It is certified that error appears in the above—identified patent and that said Letters Patent is hereby corrected as shown below:

On the title page,
   Assignee's name should read as --Dr.-Ing. Rudolf Hell GmbH--

Signed and Sealed this

Seventh Day of May 1985

[SEAL]

Attest:

DONALD J. QUIGG

*Attesting Officer*   *Acting Commissioner of Patents and Trademarks*